United States Patent
Park et al.

(10) Patent No.: US 11,941,612 B2
(45) Date of Patent: Mar. 26, 2024

(54) VEHICLE CRYPTOCURRENCY MINING SYSTEM

(71) Applicant: GA RAM PARK, Seoul (KR)

(72) Inventors: Ga Ram Park, Seoul (KR); Seung Bok Kil, Seoul (KR); Seung Seok Lee, Seoul (KR)

(73) Assignee: GA RAM PARK, Seoul (KR)

( * ) Notice: Subject to any disclaimer, the term of this patent is extended or adjusted under 35 U.S.C. 154(b) by 277 days.

(21) Appl. No.: 17/592,499

(22) Filed: Feb. 3, 2022

(65) Prior Publication Data

US 2023/0139363 A1    May 4, 2023

(30) Foreign Application Priority Data

Oct. 29, 2021    (KR) .................. 10-2021-0146800
Dec. 15, 2021    (KR) .................. 10-2021-0179251

(51) Int. Cl.
*G06Q 20/00*    (2012.01)
*G06Q 20/36*    (2012.01)

(52) U.S. Cl.
CPC .............................. *G06Q 20/3678* (2013.01)

(58) Field of Classification Search
CPC ............ G06Q 20/3678; G06Q 20/065; G06Q 20/3674; B60R 16/03; B60R 16/033; Y02T 10/92; H02J 7/14; H02M 7/42

USPC ................. 705/16, 21, 59; 380/44, 262
See application file for complete search history.

(56) References Cited

U.S. PATENT DOCUMENTS

| 2016/0219089 A1* | 7/2016 | Murthy | H04L 51/58 |
| 2023/0268869 A1* | 8/2023 | Thramann | H02S 20/10 |
| | | | 324/101 |

FOREIGN PATENT DOCUMENTS

| KR | 10-1868296 | 6/2018 |
| KR | 10-2019-0036612 | 4/2019 |
| KR | 10-2019-0134877 | 12/2019 |
| KR | 10-2020-0092706 | 8/2020 |
| KR | 10-2021-0101032 | 8/2021 |

OTHER PUBLICATIONS

Office Action for Korea Patent Application No. 10-2021-0179251, dated Jun. 1, 2023.

* cited by examiner

*Primary Examiner* — Dante Ravetti

(57) ABSTRACT

A vehicle cryptocurrency mining system includes a generator configured to generate power by driving an engine, a battery configured to the power generated by the generator, an inverter connected to the generator or the battery and configured to convert DC power into AC power, a mining device configured to mine cryptocurrency using power converted and output by the inverter, and a control device configured to monitor a mining state of the mining device.

7 Claims, 4 Drawing Sheets

VEHICLE CRYPTOCURRENCY MINING SYSTEM

CROSS-REFERENCE TO RELATED APPLICATION

This application claims priority to and the benefit of Korean Patent Application Nos. 2021-0146800 and 2021-0179251, filed on Oct. 29, 2021 and Dec. 15, 2021, the disclosure of which is incorporated herein by reference in its entirety.

BACKGROUND OF THE INVENTION

1. Field of the Invention

The present invention relates to a cryptocurrency mining system, and more particularly to a system for mining cryptocurrency using power generated by driving an engine installed in a vehicle.

2. Description of the Related Art

Cryptocurrency (crypto currency or crypto money) refers to digital money or electronic money used in electronic form in a networked virtual space without a physical object such as paper money or coins.

Among the terms used in this specification, cryptocurrency is also referred to as virtual currency, but in this specification, will be collectively referred to as cryptocurrency.

The cryptocurrency refers to money that has no substance in a virtual environment unlike real money (coins or paper money) that is actually traded. There are many types of such cryptocurrency, and representatively, there is "Bitcoin", which was first developed in 2008, and there are "Ripple", "Ethereum", "Doge" etc. that are relatively actively traded cryptocurrency. Cryptocurrencies other than Bitcoin are also called altcoins.

In the case of credit card or various simple payments, the amount used is withdrawn from a payment account deposited in a bankbook and a transaction is actually made in cash, but it is possible to buy and sell goods only with cryptocurrency without cash.

Cryptocurrency has a structure in which transactions are made by a distributed database based on peer to peer (P2P) rather than issuance and management of currency by a centralized institution.

In the case of cryptocurrency such as Bitcoin, a certain amount of Bitcoin is automatically generated at regular intervals according to a predetermined algorithm, and the generated cryptocurrency may be transferred by solving complex mathematical and cryptographic problems made through a specific algorithm.

Compared with a CPU installed in a main board of a computer, a GPU installed in a graphics card has excellent computational capability for solving the complex mathematical and cryptographic problems made through a specific algorithm, and thus cryptocurrency is mined by a plurality of hash boards with a plurality of graphic cards or a plurality of dedicated ASICs for only performing calculation necessary for cryptocurrency mining.

A normal cryptocurrency mining operation is usually performed in a building structure called a mining field, but in such a fixed type cryptocurrency mining system, a cooling system or ventilation system needs to be additionally constructed to cool a large amount of heat generated in a fixed place, and there is a problem in that there is a risk of fire when effective heat dissipation is not achieved and that commercial power needs to be purchased to operate the mining system.

Thus, there has been a need for a method of overcoming the above problems.

CITED REFERENCE

Patent Document (Patent Document 1) KR 10-2020-0024410 A
(Patent Document 2) KR 10-1872286 B1

SUMMARY OF THE INVENTION

Therefore, the present invention has been made in view of the above problems, and it is an object of the present invention to provide a vehicle cryptocurrency mining system for mining cryptocurrency using power generated by driving a vehicle and monitoring the state thereof in real time.

In accordance with the present invention, the above and other objects can be accomplished by the provision of a vehicle cryptocurrency mining system including a generator configured to generate power by driving an engine, a battery configured to the power generated by the generator, an inverter connected to the generator or the battery and configured to convert DC power into AC power, a mining device configured to mine cryptocurrency using power converted and output by the inverter, and a control device configured to monitor a mining state of the mining device.

According to an embodiment, the vehicle cryptocurrency mining system may further include a central server configured to receive the cryptocurrency mined by the mining device and to store the cryptocurrency in an electronic wallet of a vehicle driver.

According to an embodiment, the control device may be connected to the central server to communicate therewith and may monitor a state of the electronic wallet of the vehicle driver.

According to an embodiment, the central server may control the mining device, and when a mining operation stops if error occurs in the mining device, the central server may count a stop time and may perform compensation for the stop time to the vehicle driver.

According to an embodiment, the central server may provide a portion of the cryptocurrency mined by the vehicle driver, cash converted from the mined cryptocurrency, or fee generated when the mined cryptocurrency is converted into another currency, to the vehicle driver, and may provide a remaining portion to an operator of the central server.

According to an embodiment, the control device may determine whether power is supplied to the inverter from the battery, and when power supply to the inverter is maintained during a first time, the mining device may be powered on.

According to an embodiment, when remaining power of the battery is stored by power for operating the mining device during at least a second time, the control device may power on the mining device, and the second time may be a boot time or a shutdown time of the mining device.

According to an embodiment, when the engine stops being driven, the inverter may transmit a signal for powering off the mining device, and the battery may supply the stored remaining power to the mining device to allow the mining device to operate during the shutdown time.

According to an embodiment, the central server may perform user authentication with a vehicle driver using the control device, and the mining device may mine cryptocurrency when user authentication of the control device is successful.

According to an embodiment, the mining device may be installed in an enclosure formed of a shock absorbing member, and a fan for dissipating heat to an outside may be provided in the enclosure.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
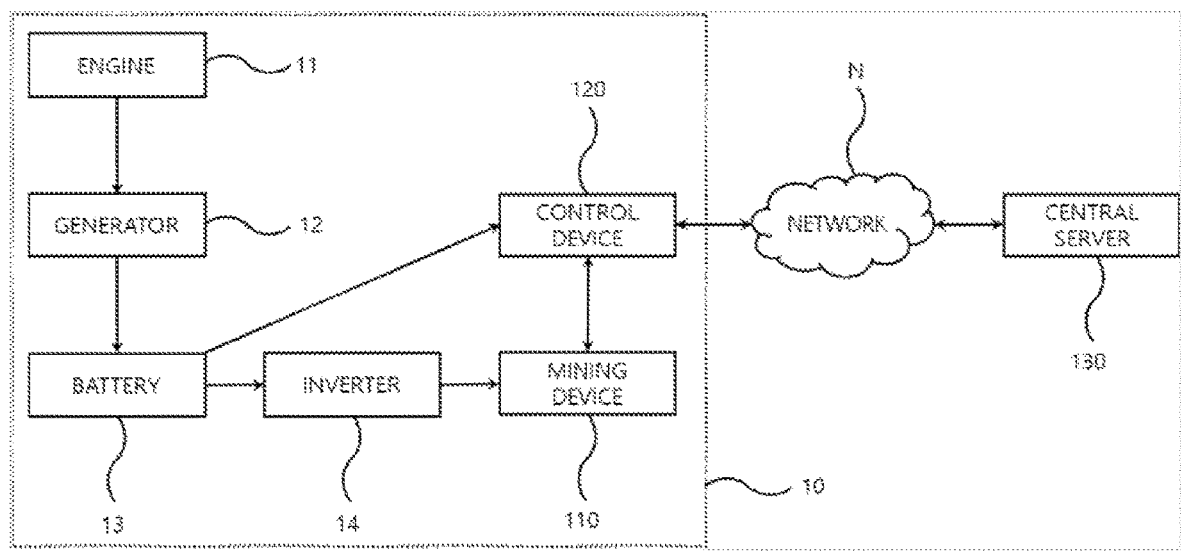
FIG. 1 is a diagram showing the configuration of a vehicle cryptocurrency mining system according to an embodiment of the present invention.

Hereinafter, the present invention will be described in detail by explaining exemplary embodiments of the present invention with reference to the attached drawings. The same reference numerals in the drawings denote like elements, and a repeated explanation thereof will not be given. The suffixes "module" and "unit" of elements herein are used for convenience of description and thus can be used interchangeably, and do not have any distinguishable meanings or functions. In the following description of the at least one embodiment, a detailed description of known functions and configurations incorporated herein will be omitted for the purpose of clarity and for brevity. The features of the present invention will be more clearly understood from the accompanying drawings and should not be understood to be limited by the accompanying drawings, and it is to be appreciated that all changes, equivalents, and substitutes that do not depart from the spirit and technical scope of the present invention are encompassed in the present invention.

It will be understood that, although the terms "first", "second", "third" etc. may be used herein to describe various elements, these elements should not be limited by these terms.

These terms are only used to distinguish one element from another element.

It will be understood that when an element is referred to as being "connected to" or "coupled to" another element, it may be directly on, connected or coupled to the other element, or intervening elements may be present. In contrast, when an element is referred to as being "directly on," "directly connected to" or "directly coupled to" another element or layer, there are no intervening elements present.

Singular expressions in the present specification include the plural expressions unless clearly specified otherwise in context.

It will be further understood that the terms "comprises" or "comprising" when used in this specification specify the presence of stated features, integers, steps, operations, elements, or components, but do not preclude the presence or addition of one or more other features, integers, steps, operations, elements, components, or groups thereof.

FIG. 1 is a diagram showing the configuration of a vehicle cryptocurrency mining system according to an embodiment of the present invention.

As shown in FIG. 1, the vehicle cryptocurrency mining system according to an embodiment of the present invention may include a generator 12 for generating power by driving an engine 11, a battery 13 for storing power generated by the generator 12, an inverter 14 that is connected to the generator 12 or the battery 13 and converts DC power into AC power, a mining device 110 for mining cryptocurrency using power converted and output by the inverter 14, and a control device 120 for monitoring a mining state of the mining device 110.

Here, the mining device 110 and the control device 120 as well as the engine 11, the generator 12, the battery 13, and the inverter 14 may be installed in a vehicle 10.

The vehicle 10 may be moveable by a motor (not shown) or the engine 11, and a type of the vehicle 10 is not particularly limited in the present invention.

The mining device 110 according to an embodiment of the present invention may be a device for performing a computation function to mine cryptocurrency and may be a computing device including at least one graphic card or hash board.

In order to perform a computation function to solve complex mathematical and cryptographic problems, the mining device 110 needs to receive power from the outside, and driving power of the mining device 110 may be generated by driving the engine 11 in the vehicle 10.

The generator 12 of the moveable vehicle 10 may generate power by driving the engine 11, at least a portion of the power generated by the generator 12 may be stored in the battery 13, and the mining device 110 may perform a mining operation of mining cryptocurrency by receiving power that is directly generated from the generator 12 or receiving pre-stored in the battery 13.

However, generally, power output from the generator 12 or the battery 13 is DC power of 12 V or 24 V, and thus in order to convert the power into sine wave AC power and to provide the converted power to the mining device 110, the vehicle cryptocurrency mining system may further include the inverter 14. This is because power received by a power supply (e.g., a switched mode power supply (SMPS)) of the mining device 110 is generally AC current.

As a result, by moving the vehicle 10 or driving the engine 11, the mining device 110 may mine cryptocurrency using the generated power.

The mining device 110 may be provided in the moveable vehicle 10, and thus external impacts may be continuously applied to the mining device 110, external impacts may cause an unintentional failure of the mining device 110, or an operation of the mining device 110 may unintentionally stop.

Thus, according to an embodiment of the present invention, the mining device 110 may be installed in an enclosure formed of a shock absorbing member such as urethane or sponge and may be provided in the vehicle 10.

According to a detailed embodiment, the mining device 110 may be provided in a trunk of the vehicle 10, and when the inverter 14 is provided in an engine room, the inverter 14 in the engine room and the mining device 110 in the trunk may be connected to each other by a power line of the mining device 110.

Cryptocurrency mined as such by the mining device 110 may be transferred to a central server 130 to an external Internet. That is, the cryptocurrency mined by the mining device 110 in the vehicle 10 may be transferred to the central server 130 connected to enable communication, and the central server 130 may store the received cryptocurrency in a previously provided electronic wallet of a vehicle driver.

In this case, the present invention is not particularly limited, but when the central server 130 according to an exemplary embodiment stores the mined cryptocurrency in the electronic wallet of the vehicle driver, the cryptocurrency may be distributed and stored in a predetermined ratio for the operator for operating the central server 130 and the vehicle driver. For example, when 10 cryptocurrencies are mined, the cryptocurrencies may be distributed and stored in a ratio of 3:7 for the operator and the vehicle driver, and that is, three and seven cryptocurrencies may be separated and stored.

As described below, this is because, in the case of error in the mining device 110, the operator maintains and repairs the mining device 110 for smooth mining, and furthermore, when a mining operation stops due to error in the mining device 110, the operator performs compensation by the stop time, which is advantageous for both the operator and the vehicle driver in terms of revenue distribution.

However, the central server 130 according to an embodiment of the present invention may directly distribute the mined cryptocurrency in a predetermined ratio between the operator and the vehicle driver, without being limited thereto, and cash converted from the mined cryptocurrency through a cryptocurrency exchange (or a cryptocurrency transaction server), or fees incurred when the mined cryptocurrency is converted into another currency (other cryptocurrency or cash, etc.) through a cryptocurrency exchange (or a cryptocurrency transaction server) may also be distributed in a predetermined ratio between the operator and the vehicle driver.

The mining device 110 may perform a mining operation when the vehicle 10 is driven and may transfer the mined cryptocurrency to the central server 130, and the central server 130 may store the cryptocurrency in an electronic wallet of a vehicle driver, and accordingly, the mining device 110 may mine cryptocurrency only after user authentication is performed with the vehicle driver and user authentication is successful.

The vehicle driver that operates the vehicle may be specified through user authentication in this way, and thus the cryptocurrency mined by the mining device 110 may be prevented from incorrectly paid to others other than the vehicle driver.

The mining device 110 may directly perform user authentication with the vehicle driver, but the mining device 110 may be installed in the enclosure formed of a shock absorbing member, as described above, and accordingly, the control device 120 provided inside the vehicle 10 may perform user authentication with the vehicle driver 와 user authentication, and may transfer the result to the mining device 110.

Accordingly, the vehicle cryptocurrency mining system according to an embodiment of the present invention may further include the control device 120 connected to the mining device 110 to communicate therewith, and the control device 120 may also be a device for controlling the state of the mining device 110 and may include a display for providing information on the state of the mining device 110 to the vehicle driver.

That is, the control device 120 may receive the current mining state of the mining device 110 upon request and may output the current mining state through a display.

The mining device 110 may be connected to the central server 130 to communicate therewith using the control device 120 as a medium rather than being directly connected to the central server 130, and in this case, the control device 120 may receive the state of the electronic wallet of the vehicle driver of the central server 130 and may output the state through the display.

The vehicle driver may check the current mining state of the mining device 110 or the state of the electronic wallet of the vehicle driver inside the central server 130 in real time through the display using the control device 120.

The control device 120 may receive user input through touch input, button input, or the like, and as described above, the control device 120 may perform user authentication with the vehicle driver through user input.

As described above, the control device 120 may control the state of the mining device 110 or may also control power on/off of the mining device 110.

Figure 2:
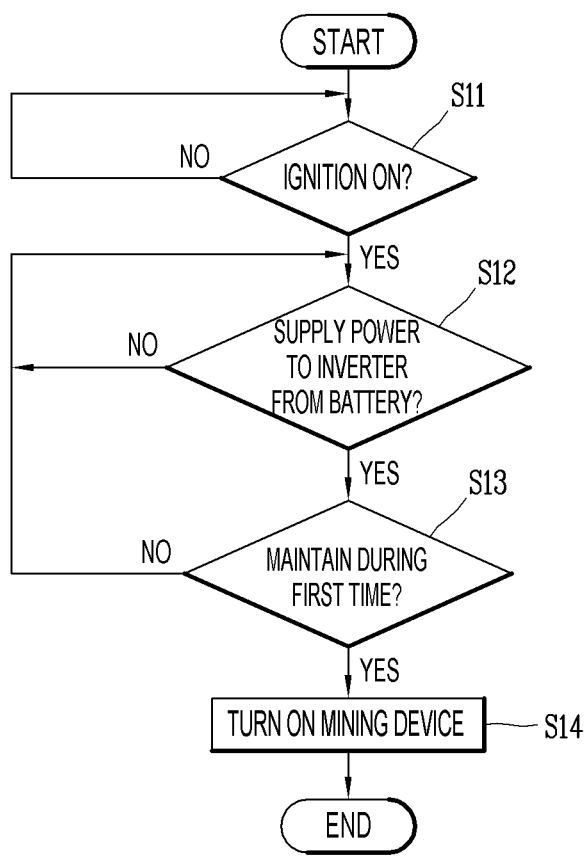
FIG. 2 is a step-by-step flowchart of a method of controlling a control device of a vehicle cryptocurrency mining system according to an embodiment of the present invention.

FIG. 2 is a step-by-step flowchart of a method of controlling a control device of a vehicle cryptocurrency mining system according to an embodiment of the present invention.

As shown in FIG. 2, the control device 120 according to an embodiment of the present invention may determine whether the engine 11 is driven with ignition on (S11), and when ignition is on, the control device 120 may determine whether power is supplied to the inverter 14 from the battery 13 (S12).

The control device 120 may detect whether DC current or voltage is supplied to a receiving end of the inverter 14 using an ammeter or a voltmeter. In this case, the control device 120 may determine whether power is continuously supplied from the battery 13 to the inverter 14 during a first time (S13), and when power is continuously supplied from the battery 13 to the inverter 14 during the first time, the mining device 110 may be turned on at last (S14).

Here, the first time may be a time for checking whether the engine 11 or the generator 12 is normally operated to continuously generate and supply power and is not particularly limited, and for example, the first time may be one minute.

The generator 12 may be driven only when the engine 11 is normally operated, and power is generated by driving the generator 12, and accordingly, the control device 120 may check whether power is continuously supplied to the receiving end of the inverter 14 during the first time, and then when power is continuously supplied during the first time, continuous supply of power may be expected in the future, and the control device 120 may turn on the mining device 110.

In contrast, when power is continuously not supplied to the receiving end of the inverter 14 during the first time, the mining device 110 may be unexpectedly shut down due to unstable power supply to cause the mining device 110 to fail, and accordingly, in this case, the control device 120 may not turn on the mining device 110.

As described above, the control device 120 may power on/off the mining device 110, but in this case, the control device 120 may control on/off of the mining device 110 depending on the remaining power of the battery 13.

Figure 3:
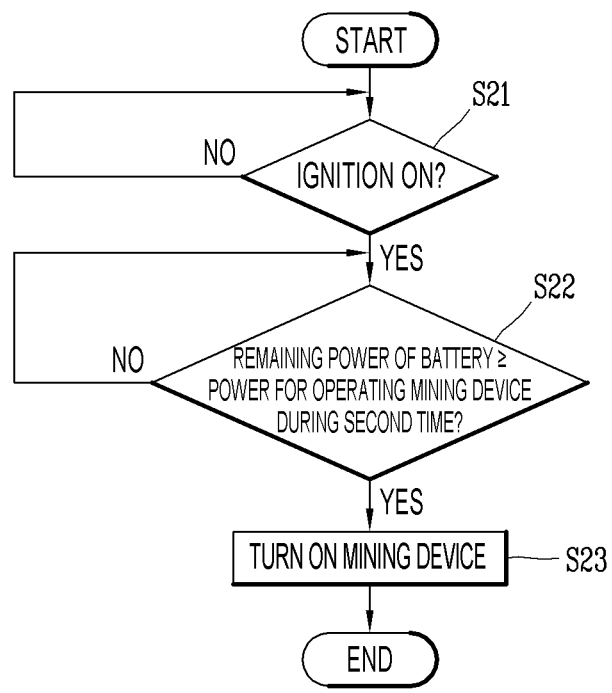
FIG. 3 is a step-by-step flowchart of a method of controlling a control device of a vehicle cryptocurrency mining system according to another embodiment of the present invention.

FIG. 3 is a step-by-step flowchart of a method of controlling a control device of a vehicle cryptocurrency mining system according to another embodiment of the present invention.

As shown in FIG. 3, the control device 120 according to an embodiment of the present invention may determine whether the engine 11 is driven with ignition on (S21) and when ignition is on, the control device 120 may determine whether the remaining power of the battery 13 is stored as much power as the mining device 110 is capable of operating for at least a second time (S22).

That is, the control device 120 may monitor the remaining power of the battery 13, and in this case, the control device 120 may check whether the remaining power of the battery 13 is equal to or larger than power for operating the mining device 110 during a second time or more.

Here, the second time may be a boot time and a shutdown time of the mining device 110. That is, during booting, the mining device 110 may read an operating system and program to have the state for performing a mining operation, and in this case, when power is not normally supplied to the mining device 110 due to lack of stored power of the battery 13 during booting of the mining device 110, the mining device 110 may have a problem that causes a malfunction such as subsequent reboots failing normally, and in contrast, when the mining device 110 does not receive normal power from the battery 13 during shutdown of the mining device 110, there is a problem in that the operating system and programs in operation during shutdown are not be terminated normally, and thus a subsequent mining operation is not performed smoothly.

Thus, the control device 120 may check whether the remaining power of the battery 13 is equal to or larger than power for operating the mining device 110 during the second time or more and may then turn on the mining device 110 when the remaining power of the battery 13 is sufficient.

However, when the vehicle 10 is turned on, the remaining power of the battery 13 may be sufficient when at least the mining device 110 is capable of operating during the booting time, but the second time may be the sum of the boot time and the shutdown time of the mining device 110, as described above.

This is because the vehicle 10, which has been released recently, is equipped with an Idle Stop & Go (ISG) function, and the engine 11 is capable of being turned off while the vehicle 10 is stopped, and accordingly, when driving of the engine 11 is stopped by the ISG function, the remaining power of the battery 13 for turning on the mining device 110 may be larger than power required during a boot time of the mining device 110 in order to prevent the mining device 110 from being unexpectedly shut down.

According to another embodiment of the present invention, the mining device 110 instead of the control device 120 may monitor the remaining power of the battery 13.

The control device 120 may determine whether the engine 11 is driven with ignition on (S21), and then, when ignition is on, a control command for turning on the mining device 110 may be generated, and in this case, the mining device 110 may not be turned on immediately according to the control command, and instead, may check whether the remaining power of the battery 13 is equal to or larger than power for operating the mining device 110 during the second time, and may then turn on the mining device 110 only when the remaining power of the battery 13 is sufficient.

Needless to say, in contrast, when the remaining power of the battery 13 is insufficient, the mining device 110 may not turn on the mining device 110 and may notify the control device 120 of that it is not possible to power on the mining device 110.

The inverter 14 may be a device for converting DC power supplied from the battery 13 into AC power required by the mining device 110 and constantly and smoothly supplying the power to the mining device 110, but the inverter 14 according to an embodiment of the present invention may generate a control command for powering off the mining device 110 when the engine 11 stops being driven and may transmit the control command to the mining device 110.

In other words, as described above, the control device 120 may control on/off of the mining device 110, but the inverter 14 according to an embodiment of the present invention may generate a control command for powering off the mining device 110.

Figure 4:
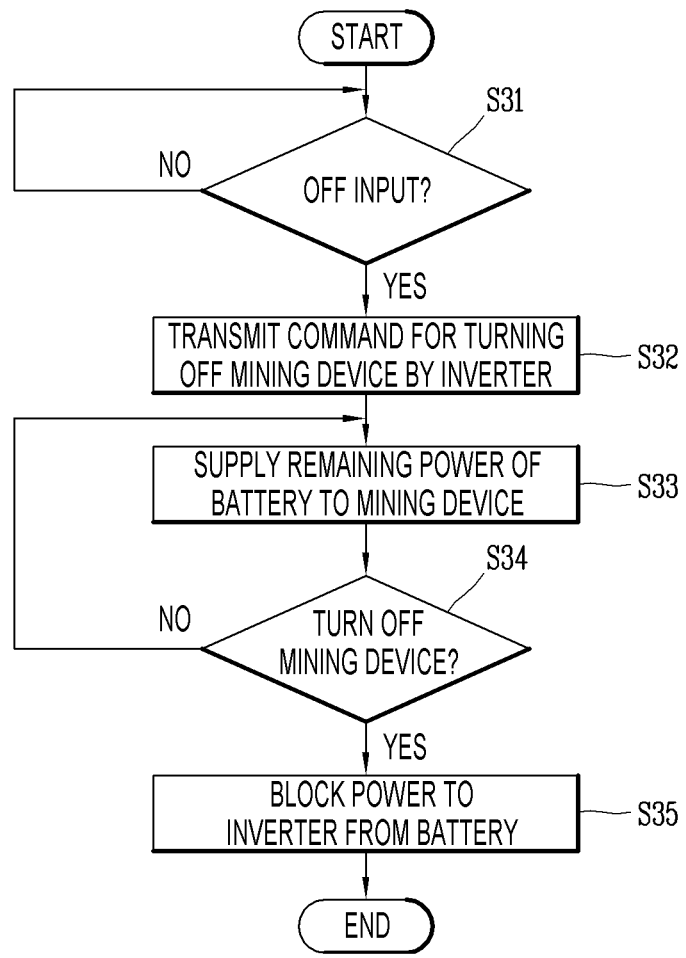
FIG. 4 is a step-by-step flowchart of a method of controlling an inverter of a vehicle cryptocurrency mining system according to an embodiment of the present invention.

FIG. 4 is a step-by-step flowchart of a method of controlling an inverter of a vehicle cryptocurrency mining system according to an embodiment of the present invention.

As shown in FIG. 4, whether there is an ON input of the vehicle 10 according to an embodiment of the present invention may be determined (S31), and when there is an OFF input, the inverter 14 may generate and transmit a control command for powering off the mining device 110 (S32).

When the engine 11 stops being driven, an operation of the generator 12 may also be consecutively stopped and may not generate power any longer. In this case, as described above, in order for the mining device 110 to normally perform a shut-off procedure, the inverter 14 may transmit a control command for power off to the mining device 110, and may then supply the remaining power of the battery 13 to the mining device 110 (S33) until the mining device 110 is completely shut down and is powered off. Thus, the remaining power stored in the battery 13 may be supplied to the mining device 110 to allow the mining device 110 to smoothly operate during the shutdown time.

Then, the inverter 14 may block power supplied from the battery 13 (S35), and thus may prevent unnecessary consumption of power stored in the battery 13.

Here, the control device 120 may generate and transmit a control command for turning off the mining device 110 according to an OFF input of the engine 11 and may supply the remaining power of the battery 13 to the mining device 110 until the mining device 110 is turned off, but generally, the control device 120 including a display device is immediately powered off according to the OFF input of the engine 11, and accordingly, the inverter 14 according to an embodiment of the present invention may control an OFF operation of the mining device 110 when the engine 11 is turned off in order to also respond to the vehicle 10.

As described above, the central server 130 may directly control the mining device 110 or may indirectly control the mining device 110 through the control device 120, and in particular, when error or failure occurs, the mining device 110 may notify the central server 130 of this.

In this case, the mining device 110 may perform self-diagnosis when error or failure occur and may transfer the diagnosis result to the central server 130, and the central server 130 may control, correct, or a reinstall a program through remote control for the mining device 110 and the central server 130 may also be remotely power on, off, or reboot the mining device 110.

As described above, the cryptocurrency mined by the mining device 110 may be distributed for the operator of the central server 130 and the vehicle driver in a predetermined ratio.

When error occurs in the mining device 110 and the mining device 110 is repaired, a mining operation may stop, and accordingly, during this time, even if the vehicle driver drives a vehicle, the central server 130 according to an embodiment of the present invention may compensate the vehicle driver for the stop time in which cryptocurrency is not capable of being mined.

However, compensation of the central server 130 for the vehicle driver may be a mining target, and the compensation may be equal to or less than an expected cryptocurrency profit to be acquired by driving the vehicle by the vehicle driver, and in detail, in order to prevent a problem of maliciously causing the mining device 110 to malfunction, compensation may be made by multiplying an expected cryptocurrency profit by a compensation rate of less than 1 (for example, 0.1).

The central server 130 may perform compensation when the mining operation is not performed even if the vehicle driver drives a vehicle, and accordingly, even if error occurs in the mining device 110, the central server 130 needs to check whether the vehicle 10 is driven.

To this end, the central server 130 may receive information on whether the vehicle 10 is driven or the engine 11 of the vehicle 10 is turned on from the control device 120 but not the mining device 110 irrespective of malfunction of the mining device 110.

As a result, the vehicle 10 may be driven or the engine 11 of the vehicle 10 may turned on, but the central server 130 may perform compensation to the vehicle driver by a value obtained by multiplying the expected cryptocurrency profit by a compensation ratio by the stop time in which the mining device 110 is not capable of mining cryptocurrency due to error in the mining device 110.

In the vehicle cryptocurrency mining system according to an embodiment of the present invention, the mining device 110 may be provided inside a moveable vehicle to perform a cryptocurrency mining operation, and in this case, a large amount of heat may be generated as the mining device 110 may perform a lot of computation.

Accordingly, a fan (not shown) for dissipating internal heat to the outside may be provided in an enclosure provided within the mining device 110 according to an embodiment of the present invention, and the internal heat of the enclosure may be dissipated to the outside by operating the fan.

However, the vehicle 10 that currently moves may have a large amount of outside air introduced into the vehicle 10 through driving, and outside air may be introduced at high wind speed without a separate fan, and accordingly, the vehicle cryptocurrency mining system according to an embodiment of the present invention may further include a duct (not shown) for inducing outside air introduced from the outside to the mining device 110.

That is, a large amount of heat generated from the mining device 110 may be cooled by air cooling by circulating large and/or high-speed outdoor air introduced through the duct.

According to an exemplary embodiment, at least one filter for filtering impurities included in outside air may be provided in the duct.

Generally, the vehicle 10 includes an air conditioner (not shown) having a cooling cycle for adjusting an indoor air conditioning environment, in particular, for indoor cooling of a vehicle, and thus outdoor air introduced from the outside may be made at lower temperature and may be provided to the mining device 110 by injecting cold air generated from the air conditioner into the duct or cooling the duct itself.

Accordingly, a large amount of heat generated from the mining device 110 may be more effectively cooled by cold air generated from the air conditioner.

The vehicle cryptocurrency mining system according to the present invention may mine cryptocurrency using power generated by driving a vehicle and may monitor the state thereof in real time.

Mining may be performed only when authentication is successful through user authentication, and accordingly, it may be possible to prevent the cryptocurrency obtained by mining from being mispaid to others.

Abnormal termination of the mining device when booting or shutting down may be prevented.

In addition, when error occurs in the mining device, the operator may make predetermined compensation to the vehicle driver.

Thus far, exemplary embodiments of the present invention have been described in detail with reference to the drawings. The description of the present invention is for illustrative purposes, and those skilled in the art to which the present invention pertains will understand that it can be easily modified into other specific forms without changing the technical spirit or essential features of the present invention.

Accordingly, the scope of the present invention is indicated by the claims to be described later rather than the above detailed description, and all changes or modifications derived from the meaning, scope, and equivalent concept of the claims should be interpreted as being included in the scope of the present invention.

DESCRIPTION OF REFERENCE NUMERALS

10: vehicle
11: engine
12: generator
13: battery
14: inverter
110: mining device
120: control device
130: central server

What is claimed is:

1. A vehicle cryptocurrency mining system comprising:
a generator configured to generate power by driving an engine;
a battery configured to the power generated by the generator;
an inverter connected to the generator or the battery and configured to convert DC power into AC power;
a mining device configured to mine cryptocurrency using power converted and output by the inverter; and
a control device configured to monitor a mining state of the mining device; and
a central server configured to receive the cryptocurrency mined by the mining device and to store the cryptocurrency in an electronic wallet of a vehicle driver,
wherein the central server provides a portion of the cryptocurrency mined by the vehicle driver, cash converted from the mined cryptocurrency, or fee generated when the mined cryptocurrency is converted into another currency, to the vehicle driver, and provides a remaining portion to an operator of the central server, and when a mining operation stops due to an error in the mining device even if the vehicle is driving, the central server that controls the mining device counts a stop time and performs compensation for the stop time to the vehicle driver, wherein the compensation is an expected cryptocurrency profit to be acquired by driving the vehicle by the vehicle driver multiplied by a compensation rate of less than 1.

2. The vehicle cryptocurrency mining system according to claim 1, wherein the control device is connected to the central server to communicate therewith and monitors a state of the electronic wallet of the vehicle driver.

3. The vehicle cryptocurrency mining system according to claim 1, wherein the control device determines whether power is supplied to the inverter from the battery, and when power supply to the inverter is maintained during a first time, the mining device is powered on.

4. The vehicle cryptocurrency mining system according to claim 1, wherein, when remaining power of the battery is stored by power for operating the mining device during at least a second time, the control device powers on the mining device, and wherein the second time is a boot time or a shutdown time of the mining device.

5. The vehicle cryptocurrency mining system according to claim 4, wherein, when the engine stops being driven, the inverter transmits a signal for powering off the mining device, and the battery supplies the stored remaining power to the mining device to allow the mining device to operate during the shutdown time.

6. The vehicle cryptocurrency mining system according to claim 1, wherein the central server performs user authentication with a vehicle driver using the control device, and wherein the mining device mines cryptocurrency when user authentication of the control device is successful.

7. The vehicle cryptocurrency mining system according to claim 1, wherein the mining device is installed in an enclosure formed of a shock absorbing member, and wherein a fan for dissipating heat to an outside is provided in the enclosure.

* * * * *